United States Patent [19]

Hemersam

[11] 4,240,946

[45] Dec. 23, 1980

[54] METHOD OF PREPARING A BITUMINOUS BINDER AND A CONSTRUCTION MATERIAL CONTAINING THE SAME

[75] Inventor: Rudolf Hemersam, Vienna, Austria

[73] Assignee: Bunzl & Biach Aktiengesellschaft, Vienna, Austria

[21] Appl. No.: 3,884

[22] Filed: Jan. 16, 1979

Related U.S. Application Data

[63] Continuation-in-part of Ser. No. 612,576, Sep. 11, 1975, abandoned.

[51] Int. Cl.$^3$ .............................................. C08L 91/00
[52] U.S. Cl. ................................ 260/28.5 AS; 404/71
[58] Field of Search ................................ 260/28.5 AS

[56] References Cited

U.S. PATENT DOCUMENTS

| | | | |
|---|---|---|---|
| 3,317,447 | 5/1967 | Black et al. | 260/28.5 AS |
| 3,853,800 | 12/1974 | Haberl | 260/28.5 AS |

*Primary Examiner*—Melvyn I. Marquis
*Attorney, Agent, or Firm*—Kurt Kelman

[57] ABSTRACT

The invention relates to the preparation of a bituminous binder on the basis of bitumen and polyolefin. This binder is prepared in a hot mixing and homogenizing process, the homogenizing being continued until the viscosity of the binder in the course of this homogenizing being distinctly or significantly reduced. The invention also relates to the preparation of a road construction material using this binder, the inorganic additive material being heated before mixing with the binder to a temperature below the decomposition temperature of the binder.

35 Claims, No Drawings

METHOD OF PREPARING A BITUMINOUS BINDER AND A CONSTRUCTION MATERIAL CONTAINING THE SAME

This is a continuation-in-part of application Ser. No. 612,576, filed Sept. 11, 1975, now abandoned.

The present invention relates to a method for preparing a bituminous, polyolefin-containing binder for road construction materials which contain dispersed solid substances of a primarily inorganic nature, such as broken stones and sand, as additive material. The invention also relates to a method for preparing a road construction material which is bonded by such a binder.

Many construction materials are known which are made with the use of a bituminous binder. Bituminously bonded construction materials have found particularly extensive utilization in the production of surfaces as well as bases for traffic lanes as well as for roofing layers, and such construction materials as known under the name mastic asphalt, rolled asphalt and bituminous gravel or macadam may be mentioned. A binder component of less than 15% of the stone or sand material is usually selected for road surfacing materials. The bitumen serving for the mentioned construction materials as binder has advantages in addition to a number of disadvantages. Thus, the bitumen tends to soften at an elevated temperature, as it is often encountered on surfaces subjected to sun rays and enhanced by the dark color of the bitumen, which may cause serious pressure deformations in surfaces made with such construction materials when subjected to traffic loads. On the other hand, however, the bitumen is subjected to embrittlement at temperatures below 0° C., which may also cause damage to the surfacing material when traffic lanes or road surfaces are subjected to a traffic load. The undesirable tendency of the bitumen to soften under high ambient temperatures as well as the tendency of the bitumen to become embrittled at low ambient temperatures may be considerable improved by the addition of polyolefins and such a polyolefin addition also improves generally the rigidity of bituminously bonded construction materials. With respect to the addition of polyolefins to bitumen, which serves as binder for construction materials, a number of proposals have been made, some of which suggest to add specially selected polyolefins to the bitumen while others propose special conditions for the mixing of the bitumen and polyolefins. When the properties of bituminous binders obtained in this manner or the properties of construction materials bonded with such bituminous binders are tested, it is found that the softening tendency of the bitumen at high temperatures and the cold embrittlement of the bitumen decrease more and more and, at the same time, the rigidity of construction materials which are bonded with such binders increases in a desirable manner. However, at the same time, the stiffness of construction materials bonded with such binders increases very substantially in the range of the working temperatures with an increasing content of a polyolefin substance in the bituminous binder, and this soon creates difficulties when it is desired to work with such construction materials in conventional techniques used with construction materials bonded with bitumen and, for example, it is desired to lay such a road construction material with a conventional road construction machine. This and also the higher purchase price of polyolefin material as compared to bitumen may have been decisive for the practice up to date to seek to blend bitumen and polyolefin in a gentle manner designed to maintain their chemical structure as much as possible since the conclusion seemed obvious that the amount of polyolefin could be held low in proportion to the extent to which the chemical structure of the polyolefin material remained undisturbed during the blending with the bitumen to obtain a certain improvement in the temperature behavior of the bituminous binder as well as to obtain a certain increase in the rigidity of a construction material bonded with such a binder. In this respect, the additional consideration appears obvious in this line of thought that the working of a construction material bonded in this manner may proceed the easier the less polyolefin, which increases the stiffness of the material, is added.

It is an object of the present invention to provide a method of the first mentioned type with which a bituminous binder for construction materials may be prepared in a simple manner, which enables these construction materials to be applied without difficulties with conventional methods and machines, and particularly to make it possible to apply also a road surfacing material bonded with such a binder with so-called "road surfacers", and which also obviates a tendency of separation of the bitumen and the polyolefin material.

The method of the invention of the first-mentioned type is characterized in that, for the formation of the binder, molten bitumen and a polyolefin (that is, polyethylene or polypropylene or a mixture of polyethylene and polypropylene) are mixed together and homogenized in hot condition while the polyolefin is melted and dissolved in the bitumen, the bitumen-polyolefin mass being homogenized at a temperature between 260° C. and 310° C. until a distinct or significant reduction of the viscosity of the binder occurs which exceeds the usual reduction of the viscosity occurring with an increase in the temperature of such a mass. In other words, homogenizing during working at a constant temperature, which working mode is preferred, is continued until a reduction of the viscosity of the mass occurs. When working with changing temperature, homogenizing is continued until the viscosity is lower than the viscosity of the mass at the respective temperature without influence of homogenization. When proceeding according to the invention, the bitumen and the polyolefin material are intimately homogenized to a uniform mass, it being possible to reduce the viscosity of the binder mass thus produced during a sufficiently long processing time to such an extent that a road surfacing material prepared with such a binder mass can be applied in a conventional manner used for working with bituminous road surfacing material. Nevertheless, the advantages are apparent which are derived from a polyethylene addition to bitumen, particularly with respect to the improvement of the temperature behavior and an increase in the resistance and the life of the construction material prepared with this binder. Furthermore, any tendency of the polyolefin and bitumen to separate disappear in the process even in those ranges for which heretofore the existence of a mixing gap was assumed, and it is now possible to prepare stable mixtures of polyolefin and bitumen in practically all proportions in question while it was previously assumed that there was a mixing gap between the bitumen-polyolefin ratios of 80:20 and 20:80, in which range a separation of the blended components may occur.

It is preferred within the scope of the method of the invention to homogenize the polyolefin material and the bitumen in a hot mixing installation until a reduction of the viscosity of the mass by one fifth to one tenth of the viscosity value of the mass immediately after the solution of the polyolefin material in the bitumen has been reached.

It has further been found to be advantageous to homogenize at a temperature of about 290° C.

It is of particular advantage in the method of the invention to add the polyolefin material to the bitumen in an amount which is at least 10% of the amount of the bitumen.

It is assumed that a degradation of the polyolefin material occurs during the method of the invention and, also, that the molecules of the bitumen are changed and that this leads to an improvement of the properties.

Polyethylene of the low as well as the high-pressure type has been found particularly useful in the method of the invention. But polypropylene may also be used. Waste material, even if it contains synthetic resins of another chemical nature, may be used as a raw material since the method of the invention in general proceeds without difficulty even in the presence of foreign substances; foreign substances, such as for example particles of thermosetting synthetic resins or high-melting thermoplastic resins, which are substantially inert, as well as other non-olefinic thermoplastic resins act similarly to fillers.

It can be assumed that the degradation of the molecules of the polyolefin material, which occurs during the above-mentioned method of the invention, is the cause of the relatively low viscosity of the bituminous binder produced with this method and of the relatively low stiffness of the construction material bonded with this binder resulting therefrom.

If a particularly good heat resistance of the binder and simultaneously a substantial lowering of the cold embrittlement is desired, it is advantageous that the amount of the polyolefin material is in excess of 10%, by weight, of the bitumen, which results in the presence of additional polyolefin in finely dispersed form in the homogenized binder; the finely dispersed polyolefin material presumably largely solidifies in crystalline form during cooling, due to its fine dispersion.

A further positive moment results from the method of the invention in the bituminous binder produced thereby in that it adheres very well to alkaline or acid reacting stones. This may be explained by the creation of salt bridge formations in which, in addition to the usual adhesion, so-called interface molecular compounds are present at the stone material-bitumen interfaces, that is, in the present case, salt bridges which effect an additional chemical bond between stone and binder.

The higher the working temperature the faster proceeds the homogenization of the bitumen-polyolefin mass in the hot mixing installation. If the work is done at about 290° C., it has been found that at a mixing ratio of polyethylene and bitumen of 30:70, the viscosity reduction occurs at a temperature of 290° C. after a homogenization of about 20 minutes. At a mixing ratio of 50:50, the viscosity reduction occurs within about 40 minutes. It has been found very advantageous for the development of the process, more particularly with respect to the speed and the viscosity to be handled, to add polyolefin material in an amount between 30 and 100% of the amount of bitumen to the bitumen for the molecule degrading homogenization.

When the treatment temperatures are low, a homogenization of the binder lasting several hours is effected for the preparation of a road surfacing binder.

During the method of the present invention, the viscosity of the polyolefin-bitumen mass to be homogenized or subjected to a heat treatment passes through several phases. First, the viscosity is relatively low, corresponding practically to the viscosity of the bitumen at the beginning of the work, which is due to the fact that at this point in time the polyolefin material has not yet melted but swims in the bitumen in the form of small particles. Gradually, these polyolefin particles melt and, concurrently, the viscosity of the mass increases. After this phase, the viscosity decreases noticeably, which is explained by the molecular degradation of the polyolefin material. Afterwards, the viscosity remains substantially constant for a longer period of time or even increases slightly, due to the formation of polyolefin-bitumen compounds.

In the preparation of road surfacing binders, the measurement of the viscosity reduction occuring during the process in the homogenization of the polyolefin material and the bitumen in the hot mixing installation is effected preferably by repeated determination of the melt index during the homogenization.

Since, as has already been mentioned, the binders may be formed at practically any ratio of bitumen to polyolefin material in the method of the invention, it is also possible in the interest of as simple and economical a procedure as possible to prepare first a homogenized binder mass with a high content of polyolefin material, and later to add bitumen for each respective application to produce the desired proportion of bitumen to polyolefin. This makes it possible to obtain the best possible conditions for the homogenizing heat treatment practically independently of the ratio bitumen-polyolefin desired for an actual application since the homogenized bitumen-polyolefin mass may be readily stored after its production and may be used without any problems after heating subsequent to such a storage. The homogenization or heat treatment process may be effected at a single mixing ratio, and the respectively selected polyolefin-bitumen ratio may be obtained at a later time by the addition of bitumen. It appears remarkable in this respect that such a subsequent addition of bitumen does not unfavorably affect the previously obtained stability against separation. A particularly homogenous binder is obtained when the additional bitumen is added to the previously homogenized bitumen-polyolefin mass and this binder blend is then mixed with stone or sand material. But it is also possible to add the homogenized bitumen-polyolefin mass and additional bitumen separately in a mixer containing the hot stone or sand material, which is particularly advantageous in making use or many existing bitumen installations which are provided with a so-called "Trinidad vessel" in carrying out the method of the invention. In the use of such existing installations, the common heat treatment of the polyolefin material and the bitumen is carried out in the mentioned "Trinidad vessel" and the mass formed in this Trinidad vessel is introduced into the mixer in which the stone or sand material is mixed with the bitumen, particularly by spraying. In this way, the method of the invention may be carried out without difficulties in existing apparatus and, because of the reduction in the viscosity of the binder which is produced by the method of the invention, the produced road surfacing material may also be applied with conventional apparatus.

The invention also relates to a method of producing construction materials on the basis of a binder and an additive material in the form of gravel and/or sand. This method is characterized in that the binder and the additive material are hot mixed with each other, and for this purpose the additive material is heated to a high temperature which, however, is below the decomposition temperature of the binder. Due to this procedure, construction materials with very advantageous properties are obtained with the use of bituminous binder prepared according to the invention. In the last mentioned method, it is advantageous to use acidic additive material, such as quartz sand and/or quartz gravel.

The stone or sand material, which is mixed with the bituminous binder in pre-heated condition, is preferably subjected to preheating at a temperature of about 200° to 280°, care being taken that the selected preheating temperature is at least about 10° C. below the decomposition temperature of the polyolefin material.

The road surfacing material prepared according to the method of the invention has very good mechanical properties and is particularly stable against pressure deformation due to traffic loads at elevated temperatures. This has been confirmed in the Marshall test conventional for judging bituminous road surfaces to which a series of samples of the road surfacing material according to the invention were subjected.

The invention will now be explained with reference to a few examples and measured values, the state of the art being represented by way of comparison.

EXAMPLE GROUP 1

Table 1

| Mixture No. | Composition | | S.P., R.&B. DIN 1995 °C. | Penetration DIN 1995 | |
|---|---|---|---|---|---|
| | Bitumen % wt. | Polyethylene % wt. | | at 2° C. 1/10 mm | at 25° C. 1/10 mm |
| 1 | 100 | 0 | 48.2 | 5 | 79 |
| 2 | 97 | 3 | 50.1 | 5 | 79 |
| 3 | 90 | 10 | 73.8 | 7 | 42 |
| 4 | 80 | 20 | 110.0 | 2 | 12 |

EXAMPLE GROUP 2

Asphalt mixtures were produced with the bituminous binders of Example Group 1 according to prevailing standards used in the production of bituminous road surfaces, with a corresponding additive mixture containing 10%, by weight, of ground limestone, 13%, by weight, natural sand 0/2, 25%, by weight, broken basalt sand 0/2, 26%, by weight, basalt gravel 2/5 and 26%, by weight, basalt gravel 5/8, the content of the binder being 6.7%, by weight. As could be expected from the gel-like character of the synthetic resin containing binder, asphalt mixtures produced in this manner and containing binder with a 10% to 20% synthetic resin content were observed to have relatively high stiffness which seemed to make the use of such asphalt mixtures with the conventional techniques available for bituminous road surfacing, that is particularly with automatic road surfacers, impossible.

The resultant asphalt mixtures were formed into Marshall test bodies with 2×50, 2×35 and 2×75 impacts, and the test bodies were then tested in the usual manner, the results being indicated in the following Table.

Table 2

| Asphalt mixture | Mineral | Binder | Binder content % wt. | Mixture density g/cm³ | Number of Impacts | Marshall test bodies | | | | Tangent Module T kp/mm |
|---|---|---|---|---|---|---|---|---|---|---|
| | | | | | | Density g/cm³ | Porosity vol. % | Stability kp | Flow value mm | |
| 2 | 0/8mm | B 80 | 6.7 | 2.652 | 2 × 35 | 2.602 | 1.9 | 630 | 6.7 | 175 |
| | | | | | 2 × 50 | 2.610 | 1.6 | 670 | 7.1 | 173 |
| | | | | | 2 × 75 | 2.613 | 1.5 | 650 | 6.9 | 164 |
| 3 | 0/8mm | B 80 +10% polyethylene | 6.7 | 2.646 | 2 × 35 | 2.553 | 3.5 | 710 | 5.3 | 554 |
| | | | | | 2 × 50 | 2.582 | 2.4 | 700 | 4.2 | 326 |
| | | | | | 2 × 75 | 2.581 | 2.5 | 760 | 4.6 | 370 |
| 4 | 0/8mm | B 80 +20% polyethylene | 6.7 | 2.640 | 2 × 35 | 2.489 | 5.7 | 1080 | 3.6 | 869 |
| | | | | | 2 × 50 | 2.511 | 4.9 | 1200 | 3.4 | 1118 |
| | | | | | 2 × 75 | 2.534 | 4.00 | 1230 | 3.6 | 1010 |

Polyethylene waste in the form of thin, transparent, irregularly shaped pieces of film having a size of about 1 to 10 mm² was mixed at temperatues of 180° to 200° C. with a conventional road surfacing bitumen B 80 in a Kotthoff mixer, and this mixture was homogenized. Respective mixtures contained 3, 10 and 20%, by weight, of polyolefin, and the homogenization required a mixing time of 10 minutes for 3%, by weight, of polyolefin, a mixing time of 15 minutes for 10%, by weight, of polyolefin and a mixing time of 30 minutes for 20%, by weight, of polyolefin to obtain a homogenous product. The resultant polyolefin-bitumen blends attained an ever more gel-like character with an increasing content of synthetic resin. The softening point, ring and ball of these blends was measured according to DIN 1995 and the penetration was measured according to DIN 1995. The results are compared in the following Table 1 with the valves measured in the same manner for road surfacing bitumen B 80 used in the blends.

EXAMPLE GROUP 3

The viscosities of polyethylene, polypropylene, polyethylene-bitumen blends and polypropylene-bitumen blends were investigated by means of a Brabender plastograph at constant temperatures (290° C. and 270° C.) over an extended period of time, the stirrer of the plastograph being rotated at 60 rpm and the required torque being measured in meter/gram. Seven tests in all were run, previously milled polyethylene waste being tested in Test 1 at 290° C., similarly milled polyethylene waste being tested in Test 2 at 270° C., a mixture of polyethylene waste and road construction bitumen B 80 in a mixing ratio of 50:50 being tested in Test 3 at 290° C., polyethylene waste and road construction bitumen B 120 in a mixing ratio 50:50 being tested in Test 4 at 290° C., polyethylene waste and road construction bitumen B 120 in a mixing ratio 30:70 being tested in Test 5 at 290° C., milled polypropylene waste being tested in Test 6 at 290° C., and milled polypropylene waste and road construction bitumen B 70 in a ratio of 30:70 being tested in Test 7 at 290° C. The test results are summarized in Table 3 hereinbelow.

Table 3

| Test No. | 1 | 2 | 3 | 4 | 5 | 6 | 7 |
|---|---|---|---|---|---|---|---|
| Material | PAE | PAE | PE + B 80 (50:50) | PE + B 120 (50:50) | PE + B 120 (30:70) | PP | PP + B 70 (30:70) |
| Test Temperature °C. | 290 | 270 | 290 | 290 | 290 | 290 | 290 |
| Testing period | | | Force Absorption (meter/gram) | | | | |
| 10 Minutes | 145 | 174 | 60 | 36 | 5 | 292 | 1 |
| 20 Minutes | 132 | 156 | 75 | 35 | 9 | 260 | 2 |
| 30 Minutes | 122 | 145 | 71 | 34 | 11 | 232 | 3 |
| 60 Minutes | 118 | 145 | 54 | 38 | 9 | 110 | 1.5 |
| 90 Minutes | 102 | 144 | 53 | 37 | 9 | 27 | 1.5 |
| 120 Minutes | 89 | 134 | 53 | 30 | 7 | | |
| 150 Minutes | 82 | 133 | 53 | 29 | 7 | | |
| 180 Minutes | 78 | 133 | 52 | 27 | 6 | | |

The molecular degradation of the polyolefin material during the homogenizing heat treatment, which becomes apparent in the reduction of the viscosity, may be clearly recognized from the measuring values listed in Table 3. This molecular degradation of the polyolefin material in conjunction with the changes in the bitumen in the polyolefin-bitumen blends leads to a marked reduction of the viscosity in the bitumen-polyolefin mass during the homogenizing heat treatment, which then remains essentially constant for a long period of time. The frequently occurring initial increase in the viscosity of the bitumen-polyolefin mass is caused by the fact that, at the beginning of the test, the polyolefin material is not yet dissolved in the bitumen and, therefore, the test instrument essentially indicates the viscosity of the bitumen and the viscosity of this blend becomes apparent only after a certain time when the polyolefin material has been dissolved in the bitumen.

Thus, in the method for preparing bituminous binders according to the invention, as represented by the polyolefin-bitumen blends of the test examples of this example group 3, a substantially lower viscosity of bituminous binders produced in this manner is obtained after the homogenizing heat treatment, which readily permits the production of asphalt mixtures, which are made from the binders with the use of the usual mineral additive substances, by techniques which are conventional for bituminous construction materials.

EXAMPLE 3A

A bitumen-polyethylene mass was prepared according to Test 3 of Example group 3 by mixing polyethylene waste and road construction bitumen B 80 in a mixing ratio of 50:50, the homogenization of this mass being effected in a mixing vessel at 290° C. for 60 minutes. The current consumption of the drive motor of the agitator was reduced by 30% after 60 minutes, compared to the measured current value after 30 minutes. This indicates a significant reduction of the viscosity. After the mass was homogenized, the polyethylene content of the mass was reduced to 12% by adding more hot road construction bitumen B 80. The thus prepared 12% bitumen-polyethylene mass was added in an amount of 6% as binder to previously heated stone material for the preparation of rolled asphalt road surfaces. Marshall bodies were made from the thus produced road construction material and these were subjected to the usual tests for Marshall stability and crushing strength. For comparison, a road construction material was prepared in the same manner from the same stone material with the use of 6% road construction bitumen B 80 as binder and Marshall bodies were also made therefrom, which were subjected to the same tests as the Marshall bodies obtained with the use of the above-described bitumen polyethylene binder. The preparation of the Marshall bodies were made according to standard with 2×50 impacts.

The measurement of the Marshall stability was effected according to standard at 60° C. The measurement of the notch crushing strength was effected according to standard at four different temperatures, that is at −25° C., 0° C., +25° C., +40° C.

The above described measuring programs was effected with three individual measurements under the same measuring conditions and the average value obtained from these individual measurements was calculated. The thus obtained (average) measuring values were as follows:

| Marshall stability: | | | |
|---|---|---|---|
| (a) Road construction material with 6% binder of 88% B 80 + 12% polyethylene | Support value Flow number S/F | 1500 (kg) 39 1/10 mm 38.1 | |
| (b) Road construction material with 6% binder of 100% B80 | Support value Flow number S/F | 1150 (kg) 47 1/10 mm 25.1 | |

| Crushing strength: | | | | |
|---|---|---|---|---|
| (a) Road construction material with 6% binder of 88% B 80 + 12% polyethylene | −25° C. 47.6 | 0° C. 45.1 | +25° C. 6.8 (kg) | 40° C. |
| (b) Road construction material with 6% binder of 100% B80 | 47.5 | 43.0 | 8.8 | 2.6 (kg) |

EXAMPLE 3B

A bitumen-polyethylene mass was prepared according to Test 5 of example group 3 by mixing polyethylene waste and road construction bitumen B120 in a mixing ratio 30:70, homogenization of this mass being carried out in a mixing vessel at 290° C. for 60 minutes. The current consumption of the drive motor of the agitator fell after 60 minutes of homogenization by 20% compared to the value of the current measured after 30 minutes. This indicated a marked reduction of the viscosity. After homogenization of the mass, masses with a polyethylene content of 12% and 19% were prepared by the addition of more hot road construction bitumen. The thus prepared 12% and 19% bitumen-polyethylene mass was added as binder in an amount of 5.5% to a previously heated conventional stone material for the preparation of rolled asphalt road surfaces. Marshall bodies were made of the thus produced road construction material and these were subjected to the usual tests for crushing strength. For comparison, a road construction material was prepared in the same manner from the same stone materials and the use of 5.5% road construction bitumen B120 as binder, and Marshall bodies were made also from this material and subjected to the same tests as the Marshall bodies made with the use of the above-mentioned bitumen-polyethylene binder.

The preparation of the Marshall bodies was effected according to standard with 2×50 impacts.

The measurement of the crushing strength was made according to standard at four different temperatures, that is −25° C. 0° C., +25° C., +50° C.

For carrying out the above measuring programs, three individual measurements were made under the same measuring conditions and the average value was formed on the basis of the thus obtained individual values. The thus obtained (average) measuring values were as follows:

| Crushing strength: | −25° C. | 0° C. | +25° C. | +50° C. |
|---|---|---|---|---|
| (a) Road construction material with 55% binder 88% B120 + 12% polyethylene | 44.6 | 41.8 | 9.1 | 2.7 (kg) |
| (b) Road construction material with 5.5% binder 81% B120 + 19% polyethylene | 42.9 | 42.6 | 13.6 | 4.0 (kg) |
| (c) Road construction material with 5.5% binder 100% B120 | 45.2 | 41.1 | 7.2 | 1.9 (kg) |

EXAMPLE GROUP 4

Polyethylene flakes were homogenized with a conventional road construction bitumen B 120 for about 3 hours at a working temperature going above 240° C. in a pilot test in a hot mixing installation designed for working Trinidad asphalt. A 50:50 mixture of polyethylene and bitumen was formed and this mixture was subsequently brought to a bitumen content of 15, 18, 20 and 25% by adding more hot bitumen. These polyethylene-bitumen blends were then sprayed into conventional mixed aggregates (Wibau) which contained a stone additive material heated to 230° C. and, in this manner, asphalt mixtures were produced. A surface having a total length of about 600 meters and a width of 5 meters was produced on a road carrying an average traffic load from the blends containing 15, 18 and 25% polyethylene, as well as bitumen without synthetic resin content for purposes of comparison, as binders for the construction material. The road surface was produced with a road surfacing machine and the material applied by the road surfacer was then compacted with a rubber roller and two tandem rollers. It was determined that the construction material which was prepared with the binder containing 25% polyethylene could be applied without difficulty with the road surfacing machine, i.e. it had a stiffness which permitted the use of the working techniques conventional for bitumen. Nevertheless, subsequent tests made with test bodies partially formed from the mixtures and partially removed from the finished road surface in the shape of plugs showed the improvements resulting from the synthetic resin addition to the bitumen despite the molecular degradation of the polyolefin material. Some parameters were measured which showed an improvement of the properties compared to a simple synthetic resin addition to bitumen without molecular degradation.

It may be pointed out in this connection that the measurement of the notch tensile strength of Marshall-bodies taken at 20° C. showed that the break in bodies whose binders are free of polyolefin occurs in the region of the binder between the aggregate particles while the break occurs in a plane and across the aggregate particles and the binder in Marshall-bodies made of mixtures K III and K IV, i.e. bodies made of asphalt containing binders produced according to the invention. This proves the extra-ordinary adhesion of the bituminous binder of thks invention to the aggregate particles, which may be explained by the formation of salt bridges formed between the polyolefinnaphthene compounds and the surfaces of the aggregate particles.

Furthermore, measurements of the gliding value tested with an RRL-pendulum instrument according to British Standard 812:1967 and SNV 640 555 on the road surface showed that the road strips with the binders according to the invention had somewhat better traction (average value obtained from a large number of measurements SRT 63) than those with bitumen P 120 binders without polyolefin content (average value obtained from a large number of measurements SRT 61), the binder contents being 7%.

The following Tables 4 and 5 show the test values obtained with Marshall bodies and plugs. Measuring values obtained from Marshall bodies from polyolefin-free bitumen are listed under AB 0/12 while those listed under AB 0/12K are those measured on Marshall bodies made from a material whose mineral additive component was the same as that of body AB 0/12, a polyethylene-bitumen mixture with 20% polyethylene content being used as binder in Marshall bodies AB 012/K. The binder content of Marshall bodies AB 0/12K was 7%. Table 5 lists measuring values under K I, K III and K V, which were found in Marshall bodies and plugs, each of the Marshall bodies having been prepared from the bituminously bound construction material of one of the three test strips, the mineral additive being the same in all three cases, the values of the synthetic resin-free bitumen bound construction material being listed under K I, the values of the construction material bound with a bituminous binder containing 25% polyethylene being listed under K III and the values of the construction material bound with a bituminous binder containing 15% polyethylene being listed under K V. The binder content was 6.5% in all these construction materials. Marshall bodies and plugs of material bound with bituminous binders prepared according to the method of the invention showed considerable superiority over those bound with synthetic resin-free bitumen even under tests simulating extreme weather conditions.

Marshall bodies made from the three previously mentioned materials which were applied to the mentioned test strip were subjected to different pertinent tests. In the first one of these tests, the test body was subjected to the following cycle repeated five times:

(a) Submersion in a saturated salt solution at a temperature from 20° C. to 22° C. for a period of 15 hours.

(b) Exposure to air at a temperature from 20° C. to 22° C. for a period of 9 hours.

(c) Exposure to cold air at a temperature of −20° C. (in an air conditioned room) for a period of 15 hours.

(d) Exposure to air at a temperature from 20° C. to 22° C. for a period of 9 hours.

Immediately after the final cold air exposure, the compression strength was measured with a steel ram of 50 sq. cm cross section and a broken edge, moving at a speed of 25 mm/minute. The following values were measured:

bitumen binder broke under their own weight in the course of the temperature changes.

Table 4

| Material | Tests on Marshall bodies | | | | | | |
|---|---|---|---|---|---|---|---|
| | AB 0/12 | | | AB 0/12 K | | | |
| | x̄ | n | μ 95% | x̄ | n | μ 95% | Dimension |
| Marhsall stability value | 1240 | 5 | 1120–1350 | 1900 | 4 | 1890–1920 | kp |
| Marshall flow value | 47 | 5 | 43–52 | 31 | 4 | 22–40 | 1/10 mm |
| Crushing strength | 107 | 3 | 71–142 | 433 | 4 | 305–560 | kp |
| Crushing strength flow value | 21 | 3 | 20–23 | 12 | 4 | 9–15 | 1/10 mm |
| Penetration at 50 kg, 60° C., 5cm², 1 h | 0.29 | 6 | 0.04–0.54 | 0.11 | 6 | 0.03–0.19 | mm |
| Penetration at 75kg, 60° C., 5cm², 1 h | test body disintegrated | | | 0.20 | 6 | 0.13–0.27 | mm |
| Penetration at 75kg, 40° C., 5cm², 1 h | 0.31 | 3 | 0.19–0.43 | 0.11 | 3 | 0.00–0.23 | mm |
| Volumetric density | 2.461 | 51 | 2.459–2.463 | 2.427 | 49 | 2.423–2.431 | g/cm³ |
| Gross density | 2.506 | 8 | 2.498–2.514 | 2.466 | 7 | 2.454–2.478 | g/cm³ |
| Porosity | 1.8 | — | — | 1.6 | — | — | vol % |
| Marshall stability value after 80 days in water at 60° C. | 1140 | 6 | 1070–1210 | 1510 | 5 | 1460–1560 | kp |
| Marshall flow value after 80 days in water | 47 | 6 | 42–53 | 43 | 5 | 39–47 | 1/10 mm |

| Material | Compression strength 50 cm² | Compression strength |
|---|---|---|
| K I | above 10,000 kp | above 200 kg/cm² |
| K III | above 10,000 kp | above 200 kp/cm² |
| K V | above 10,000 kp | above 200 kp/cm² |

In a further test, a seven-hour storage at room temperature was used subsequent to the above cycle and the compression strength was then determined, with the following results:

| Material | Compression strength 50 cm² | Compression strength |
|---|---|---|
| K I | 4,000 kp | about 80 kp/cm² |
| K III | 6,150 kp | " 123 kp/cm² |
| K V | 6,350 kp | " 127 kp/cm² |

In still further tests, the Marshall bodies were subjected five times to a cycle consisting of storage in cold air at a temperature of −20° C. for 15 hours and a subsequent exposure to air at a temperature of +20° C. to 22° C. for 33 hours. Subsequent to the final cold air storage, the Marshall bodies were stored at a temperature of 20° C. to 22° C., whereupon the compression strength was measured, with the following results:

| Material | Compression strength 50 cm² | Compression strength |
|---|---|---|
| K I | 3,800 kp | about 76 kp/cm² |
| K III | 6,350 kp | " 127 kp/cm² |
| K V | 6,400 kp | " 128 kp/cm² |

Finally, plugs having a diameter of 15 cm and a height of 5 cm were subjected 12 times to a cycle consisting of storage for 12 hours at 60° C. and subsequent storage for 6 hours at −20° C. The compression strength was then measured at 1,250 kp when the sample with a bitumen binder containing 15% polyethylene was subjected to the load of a ram of 50 cm² cross section, while this rose to 1,500 kp when the binder contained 25% polyethylene. Plugs with a conventional Table 5

| | Tests with Marshall bodies and boring samples | | | |
|---|---|---|---|---|
| Material | K I | K III | K V | |
| Marshall bodies of average volumetric density | 2.405 | 2.298 | 2.350 | g/cm³ |
| Plugs of average volumetric density | 2.437 | 2.303 | 2.364 | g/cm³ |
| Average gross density | 2.504 | 2.461 | 2.490 | g/cm³ |
| Porosity Marshall | 4.0 | 6.6 | 5.6 | vol. % |
| Porosity boring sample | 2.7 | 6.4 | 5.0 | vol. % |
| Degree of compression | 101 | 100 | 101 | % |
| Marshall stability | 840 | 1,830 | 1,750 | kp |
| Flow value Marshall | 21 | 16 | 17 | 1/10 mm |
| Crushing strength at 20° C. | 830 | 1,780 | 1,520 | kp |
| Crushing strength flow value | 29 | 22 | 22 | 1/10 mm |
| Axial pressure test 20° C., 50 mm/min | 6,730 | 9,850 | 10,600 | kp |

EXAMPLE 5

A mixture of 88 parts road construction bitumen B 100 and 12 parts of a polyolefin material consisting predominantly of polyethylene waste was homogenized at 290° C. in a heated vessel which was equipped with a fast-running agitator which enabled the content of the vessel to be worked intensively. After 30 minutes, the mass visually appeared to be homogenous. Subsequently, the homogenization was contained at the same temperature for another 30 minutes. Test samples were removed from the mass at intervals of 5 minutes and the viscosity thereof was measured with a discharge viscosimeter having a capacity of 1 liter and a discharge bore having a diameter of 6.5 mm. Before the measurement, the temperature of each test sample was brought to 190° C. The discharge time of the first measurement was 280 seconds, of the second measurement the discharge time also was 280 seconds, the discharge time of the third measurement was 290 seconds, the discharge time of the fourth measurement was 265 seconds, the discharge time of the fifth measurement was 240 seconds, the discharge time of the sixth measurement was 235 seconds and the discharge time of the seventh measurement was 225 seconds. Afterwards, the homogenization treatment was discontinued.

The thus obtained bitumen-polyolefin mass was added as binder in an amount of 6% to previously heated stone material conventional for rolled asphalt road surfaces. Marshall bodies were made from the thus obtained road construction material in the usual manner with the application of 2×50 impacts. These Marshall bodies were tested in the usual manner to determine their Marshall stability. A Marshall stability value of 1160 kg was found and a flow value of about 53×1/10 mm.

For comparison, a road construction material was prepared in the usual manner from the same stone material and the same charge of the previously used road construction bitumen B 100 (i.e. which contained no polyolefin addition) and Marshall bodies were made analogously therefrom. A Marshall stability value of 700 kg was found therein and a flow value of 100×1/10 mm.

I claim:

1. A method for preparing a bituminous, polyolefin-containing binder for a road construction material containing dispersed solid additives of a predominantly inorganic nature, which comprises mixing and homogenizing molten bitumen and polyethylene in a hot state while melting and dissolving the polyethylene in the bitumen to form a binder mass, the bitumen-polyethylene binder mass being homogenized at a temperature between 260° C. and 310° C. until a significant reduction of the viscosity of the binder mass occurs which exceeds a decrease of the viscosity of said mass attendant upon a mere rise to said temperature of said mass.

2. The method of claim 1, wherein the molten bitumen and polyethylene are homogenized at a temperature of about 290° C.

3. The method of claim 1, wherein the molten bitumen and polyethylene are homogenized at a substantially constant temperature.

4. The method of claim 1, wherein at least 10%, by weight, based on the weight of the bitumen, of the polyethylene is added to the bitumen.

5. The method of claim 4, wherein between 30% and 100%, by weight, based on the weight of the bitumen, of the polyethylene is added to the bitumen.

6. The method of claim 1, wherein the binder mass is mixed and homogenized at said temperature for several hours.

7. The method of claim 1, wherein the binder mass is mixed and homogenized until the viscosity of the mass has been reduced by one fifth to one tenth of the viscosity the binder mass has immediately after the polyethylene has been dissolved in the molten bitumen.

8. The method of claim 1, which further comprises measuring the melt index of the binder mass repeatedly during the mixing and homogenizing to determine the reduction of the viscosity of the binder mass.

9. The method of claim 1, which further comprises adding additional bitumen to the binder mass after it has been completely homogenized.

10. The method of claim 9, wherein the additional bitumen is added to the binder mass after an intermediate storage of the mass.

11. A method for preparing a bituminous, polyolefin-containing binder for a road construction material containing dispersed solid additives of a predominantly inorganic nature, which comprises mixing and homogenizing molten bitumen and polypropylene in a hot state while melting and dissolving the polypropylene in the bitumen to form a binder mass, the bitumen-polypropylene binder mass being homogenized at a temperature between 260° C. and 310° C. until a significant reduction of the viscosity of the binder mass occurs which exceeds a decrease of the viscosity of said mass attendant upon a mere rise to said temperature of said mass.

12. The method of claim 11, wherein the molten bitumen and polypropylene are homogenized at a temperature of about 290° C.

13. The method of claim 11, wherein the molten bitumen and polypropylene are homogenized at a substantially constant temperature.

14. The method of claim 11, wherein at least 10%, by weight, based on the weight of the bitumen, of the polypropylene is added to the bitumen.

15. The method of claim 14, wherein between 30% and 100%, by weight, based on the weight of the bitumen, of the polypropylene is added to the bitumen.

16. The method of claim 11, wherein the binder mass is mixed and homogenized at said temperature for several hours.

17. The method of claim 11, wherein the binder mass is mixed and homogenized until the viscosity of the mass has been reduced by one fifth to one tenth of the viscosity the binder mass has immediately after the polypropylene has been dissolved in the molten bitumen.

18. The method of claim 11, which further comprises measuring the melt index of the binder mass repeatedly during the mixing and homogenizing to determine the reduction of the viscosity of the binder mass.

19. The method of claim 11, which further comprises adding additional bitumen to the binder mass after it has been completely homogenized.

20. The method of claim 19, wherein the additional bitumen is added to the binder mass after an intermediate storage of the mass.

21. A method for preparing a butuminous, polyolefin-containing binder for a road construction material containing dispersed solid additives of a predominantly inorganic nature, which comprises mixing and homogenizing molten bitumen, polyethylene and polypropylene in a hot state while melting and dissolving the polyethylene and polypropylene in the bitumen to form a binder mass, the bitumen-polyethylene-polypropylene binder mass being homogenized at a temperature between 260° C. and 310° C. until a significant reduction of the viscosity of the binder mass occurs which exceeds a decrease of the viscosity of the mass attendant upon a mere rise to said temperature of said mass.

22. The method of claim 21, wherein the molten bitumen and polyethylene and polypropylene are homogenized at a temperature of about 290° C.

23. The method of claim 21, wherein the molten bitumen and polyethylene and polypropylene are homogenized at a substantially constant temperature.

24. The method of claim 21, wherein at least 10%, by weight, based on the weight of the bitumen, of the polyethylene and polypropylene is added to the bitumen.

25. The method of claim 24, wherein between 30% and 100%, by weight, based on the weight of the bitumen, of the polyethylene and polypropylene is added to the bitumen.

26. The method of claim 21, wherein the binder mass is mixed and homogenized at said temperature for several hours.

27. The method of claim 21, wherein the binder mass is mixed and homogenized until the viscosity of the mass has been reduced by one fifth to one tenth of the viscosity the binder mass has immediately after the polyethylene and polypropylene has been dissolved in the molten bitumen.

28. The method of claim 21, which further comprises measuring the melt index of the binder mass repeatedly during the mixing and homogenizing to determine the reduction of the viscosity of the binder mass.

29. The method of claim 21, which further comprises adding additional bitumen to the binder mass after it has been completely homogenized.

30. The method of claim 29, wherein the additional bitumen is added to the binder mass after an intermediate storage of the mass.

31. A method for preparing a road construction material containing dispersed solid additives of a predominantly inorganic nature, which comprises mixing and homogenizing molten bitumen and at least 10%, by weight, based on the weight of the bitumen, of at least one polyolefin selected from the group consisting of polyethylene and polypropylene in a hot state while melting and dissolving the polyolefin in the bitumen to form a binder mass, the bitumen-polyolefin binder mass being homogenized at a temperature between 260° C. and 310° C. until a significant reduction of the viscosity of the binder mass occurs which exceeds a decrease of the viscosity of said mass attendant upon a mere rise to said temperature of said mass, preheating the additives, and mixing the homogenized binder mass at an elevated temperature with the preheated additives.

32. The method of claim 31, wherein the binder mass and additional bitumen are added to the preheated additives separately from each other.

33. The method of claim 31, wherein the additives are preheated to a temperature between 200° C. and 280° C. but at least 10° C. less than the decomposition temperature of the binder mass.

34. The method of claim 31, wherein the additives consist of acidic stone material.

35. The method of claim 34, wherein the acidic stone material is quartz sand or quartz gravel.

* * * * *

UNITED STATES PATENT AND TRADEMARK OFFICE
CERTIFICATE OF CORRECTION

PATENT NO. : 4,240,946

DATED : Dec. 23, 1980

INVENTOR(S) : Rudolf Hemersam

It is certified that error appears in the above–identified patent and that said Letters Patent are hereby corrected as shown below:

On the title page, insert:--
[30]      Foreign Application Priority Data

Sep. 13, 1974    Austria ............... 7419/74
May 2, 1975      Austria ............... 3406/75

Signed and Sealed this

Seventeenth Day of March 1981

[SEAL]

Attest:

RENE D. TEGTMEYER

Attesting Officer    Acting Commissioner of Patents and Trademarks